US012793207B2

(12) United States Patent
Rios et al.

(10) Patent No.: US 12,793,207 B2
(45) Date of Patent: Nov. 10, 2026

(54) SYSTEMS AND METHODS FOR AUTOMATED BROKEN TOOL DETECTION

(71) Applicant: HAAS AUTOMATION, INC., Oxnard, CA (US)

(72) Inventors: Jose Alejandro Rios, Port Hueneme, CA (US); Jonathan Christian Borao, Canoga Park, CA (US); Mikhail Mushkatblat, Studio City, CA (US); Sergey Lototsky, Camarillo, CA (US)

(73) Assignee: HAAS AUTOMATION, INC., Oxnard, CA (US)

( * ) Notice: Subject to any disclaimer, the term of this patent is extended or adjusted under 35 U.S.C. 154(b) by 0 days.

(21) Appl. No.: 18/746,933

(22) Filed: Jun. 18, 2024

(65) Prior Publication Data

US 2025/0061562 A1 Feb. 20, 2025

Related U.S. Application Data

(60) Provisional application No. 63/519,896, filed on Aug. 16, 2023.

(51) Int. Cl.
*G06T 7/00* (2017.01)

(52) U.S. Cl.
CPC .......... *G06T 7/001* (2013.01); *G06T 2200/24* (2013.01); *G06T 2207/20081* (2013.01); (Continued)

(58) Field of Classification Search
None
See application file for complete search history.

(56) References Cited

U.S. PATENT DOCUMENTS

2005/0222705 A1* 10/2005 Budd ................. G01B 11/2433 700/175
2018/0272491 A1* 9/2018 Yang .................. B23Q 17/0971
(Continued)

FOREIGN PATENT DOCUMENTS

WO 2022221502 A1 10/2022

OTHER PUBLICATIONS

International Search Report for PCT/US2024/034481, mailed Oct. 11, 2024.

*Primary Examiner* — Heather R Jones
(74) *Attorney, Agent, or Firm* — EVERSHEDS SUTHERLAND (US) LLP

(57) ABSTRACT

Systems and methods for automated broken tool detection are provided. An example method involves capturing an image of a tool that is provided in a machine (such as a computer numerical control ("CNC") machine). Using the image, a reference model for the tool is established. After usage of the tool, a second image is captured and the image is compared to the reference model using a machine learning model. For example, the comparison may involve comparing a geometry of the tool in the model to a geometry of the tool shown in the current image. Based on the comparison, it may be determined if the tool was broken during usage. If it is determined by the machine learning model that the tool is broken, then an alert may be provided to an operator of the machine. A user interface may also be provided that allows the operator to select a particular tool for analysis and specify a tool geometry change tolerance value.

20 Claims, 9 Drawing Sheets

200

(52) U.S. Cl.
CPC ............... *G06T 2207/20104* (2013.01); *G06T 2207/30164* (2013.01)

(56) References Cited

U.S. PATENT DOCUMENTS

| | | | | |
|---|---|---|---|---|
| 2020/0125068 | A1* | 4/2020 | Trounson, III .. | G05B 19/40938 |
| 2022/0051394 | A1* | 2/2022 | Chang .................. | G05B 19/182 |
| 2022/0206464 | A1 | 6/2022 | Gosselin et al. | |
| 2023/0096314 | A1* | 3/2023 | Zhang ................ | B23Q 17/2466 700/175 |

* cited by examiner

SYSTEMS AND METHODS FOR AUTOMATED BROKEN TOOL DETECTION

CROSS-REFERENCE TO RELATED APPLICATIONS

This application claims priority to and benefit of U.S. provisional patent application No. 63/519,896 filed Aug. 16, 2023, which is herein incorporated by reference.

BACKGROUND

Computer numerical control ("CNC") machines execute a sequence of commands or instructions in a machining program to shape a workpiece. For example, a workpiece may be a metal, plastic, wood, foam, composite, or other material that may be cut and/or otherwise manipulated to form a part. These workpieces may be formed using tools, such as drills or taps. Tools have geometric attributes such as shape or dimensions which may be fundamental to the correct shaping of the workpiece.

CNC machine tools may repeatedly execute a machining program to shape multiple identical workpieces. Consequentially, during the operation of the CNC machine tool over time, tools may exhibit a change in geometric attributes as a result of a command or instruction error, tool defect, or tool wear. The tool geometry change must be detected in order to avoid damaging a workpiece or multiple workpieces.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

DETAILED DESCRIPTION

Figure 1:
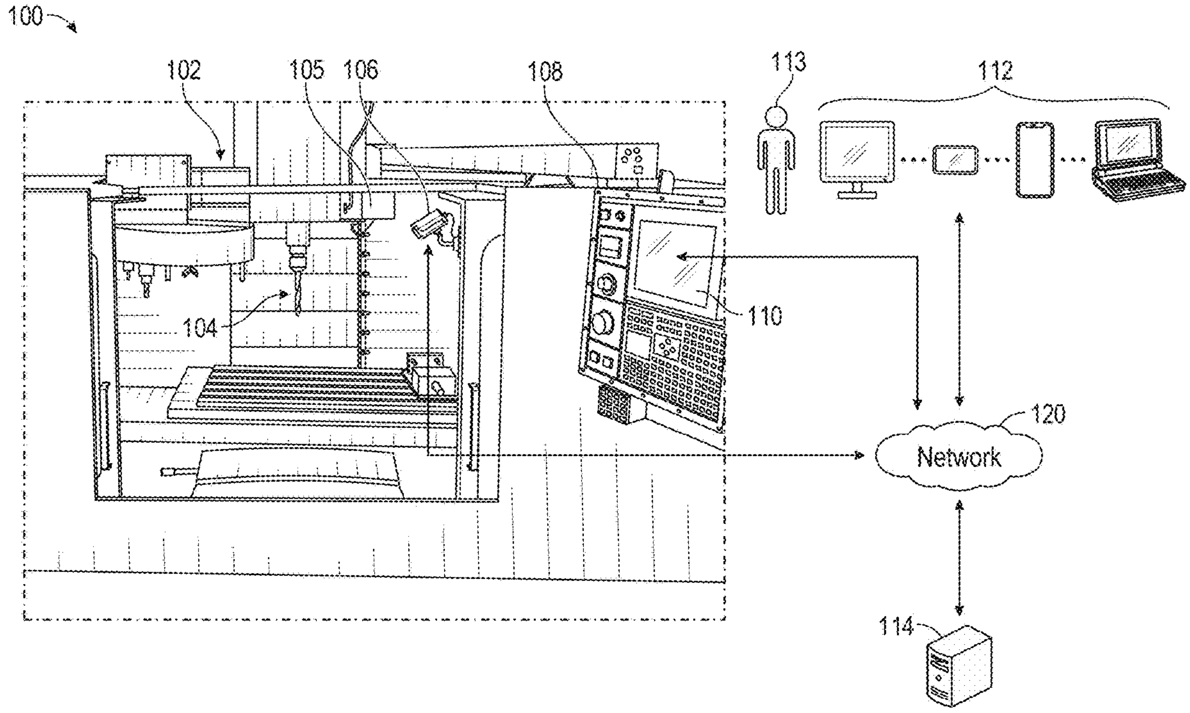
FIG. 1 depicts an example system for automated broken tool detection in accordance with one or more example embodiments of the disclosure.

This disclosure relates to, among other things, systems and methods for automated broken tool detection. Particularly, the systems described herein may automatically detect when a tool used in a machine (such as a tool used in a CNC machine, as a non-limiting example) is broken and no longer suitable for usage. The system captures one or more images of a tool and compares the one or more images to a reference model for the tool. If certain properties (such as the geometric shape of the tool and/or any other properties) differ from the model of the tool by more than a threshold amount, then the tool may be determined to be broken. While reference is made herein to the detection of broken tools, a similar approach may also be used to detect worn tools (or any other changes in the properties of tools) as well.

In one or more embodiments, the approach for tool detection may initially involve the creation of one or more reference models for different types of tools that may be used in the machine. To create a reference model for a given type of tool, one or more images of the tool may be captured by the camera when the tool is unbroken. For example, one or more images may be captured of the tool when the tool is first inserted into the machine. However, the one or more images may also be captured without requiring the tool to be inserted in the machine. Additionally, any other type of sensor may be used to capture information about the tool as well (in addition to or alternatively to images captured by a camera). The reference model may then be stored in memory of a local computing device associated with the machine or a remote computing device, such as a remote server.

Once a reference model is established for a given type of tool, the reference model may serve as a frame of reference for determining if the same type of tool is broken after usage within the machine. The reference model may include a number of different types of information about the tool. For example, the model may provide an indication of the geometry of the tool. The geometry of the tool may include, for example, a single dimensional or multi-dimensional geometric property such as a dimension (e.g., depth, length, width, height, etc.), a shape (e.g., square, triangle, cube, sphere, etc.), a color, etc. The reference model may also include any other types of information that may be used as a point of comparison for identifying if the tool is broken after usage.

Additionally, multiple reference models may be stored for different types of tools. A first type of tool may include geometric properties that are different than a second type of tool. Thus, distinct reference models may be generated for the first type of tool and the second type of tool. When either the first type of tool or the second type of tool is inserted into the machine, the reference model associated with that particular type of tool may be accessed to perform the broken tool detection for that tool.

Any reference to different types of tools may refer to tools suitable to perform different tasks. However, reference to different types of tools may also refer to tools suitable to perform the same type of task but are associated with different properties. For example, a 5 mm drill bit and a 10 mm drill bit may both be configured to perform the same type of task, but may require different reference models given their unique geometric properties (e.g., differing dimensions).

To ensure that the proper reference model is accessed depending on the type of tool that is inserted into the machine, a user interface may be provided. For example, the user interface may be presented to a user through a display of a local computing device located at the machine (such as local computing device 108 shown in FIG. 1). However, the user interface may also be presented on any other type of device as well, such as a mobile device (such as mobile device 112 shown in FIG. 1) of a user, a remote device (such as remote computing device 114 shown in FIG. 1), such as a remote server, etc. The user interface may include a listing of different types of tools that are selectable by the user. When the user inserts a type of tool into the machine for usage, the user may then select the type of tool through the user interface so the system accesses the reference model for that type of tool when performing the broken tool analysis. As a non-limiting example, the user interface may include a drop-down listing of different types of tools from which the user may select.

The identification of the type of tool may also be performed automatically without requiring a user to manually select the type of tool through the user interface. For example, the system may capture an image of the tool and may use computer vision techniques or any other suitable method for automatically identifying the particular type of tool. The type of tool may also be identified in any other suitable manner. For example, a barcode may be provided on the tool that may provide information about the type of tool.

In one or more embodiments, the comparison between the reference model and the current image of the tool may be performed using one or more computing model(s). A computing model may generally refer to any type of artificial intelligence model (e.g., machine learning, neural network, etc.). For simplicity, reference may be made herein to a "machine learning model," however this is not intended to be limiting and any other type of artificial intelligence or the like may be used instead. Furthermore, any reference to a single machine learning model is not intended to be limiting and may also refer to multiple machine learning models, and vice versa.

The one or more machine learning model(s) may be used in real-time to analyze a current image of a tool that is captured after usage of the tool, and the model may generate the output indicating whether the tool is broken or unbroken. The output may be any suitable form that may be used to distinguish between a broken tool and an unbroken tool. For example, the output may be a string, a Boolean value, etc.

The one or more machine learning model(s) may also be used for other purposes beyond performing the comparison as well. For example, the machine learning model may be used to identify a specific type of tool that has been provided in the machine, may be used to determine when a task has been completed using the tool, and/or may be used to make any other automated determinations described herein.

The one or more machine learning model(s) may also be pre-trained to perform the comparison between a current image of the tool and a reference model for the tool (and may also be pre-trained to make any other determinations described herein). For example, an image of a tool may be captured by an image capture device within the machine before usage of the tool (or may be captured by a camera or sensor outside of the machine as well). The reference model for the tool may be generated based on this image and manual annotations may be provided by a user along with the reference model as training data for the machine learning model. For example, annotation may involve a user manually adding details, such as the type of tool, features of interest, and/or any other types of data that may be used for training purposes. The training data may also include images of broken tools. Thus, the one or more machine learning model(s) may be trained with images of broken tools to more effectively identify when a particular tool is broken. The one or more machine learning model(s) may be trained in a similar manner for any number of different types of tools as well.

Additionally, in some instances, a feedback mechanism may exist to further train the one or more machine learning model(s) even after the one or more machine learning model(s) have been pre-trained. For example, the one or more machine learning model(s) may be used in real-time to analyze a current image of a tool that is captured after usage of the tool, and the model may generate the output indicating whether the tool is broken or unbroken. As shown in further detail in FIG. 2, a visual indication of the reference image of the tool and a current image of the tool captured after usage of the tool may be presented via the user interface. The user interface may also present an indication of whether the one or more machine learning model(s) detected that the tool is currently broken. The user interface may provide the feedback mechanism in that the user may be able to verify whether the output of the one or more machine learning model(s) are correct (for example, indicate through the user interface whether the tool is actually broken or unbroken). These inputs may then be used by the one or more machine learning model(s) for further training purposes. In this manner, the accuracy of the model may improve over time.

In one or more embodiments, the broken tool determination may also be performed based on user-defined tolerance values (also referred to as threshold values herein). For example, the user may specify that a tool should not be determined by the machine learning model to be broken unless an overall length of the tool differs from the reference model for that tool by more than an inch. The use of the length of the tool is merely one example of a tolerance value that may be defined by the user and tolerance values for any other properties used to detect a broken tool may also be established. Additionally, the user may establish different tolerance values for different types of tools. For example, a drill bit of a first size may have a difference length tolerance value than a drill bit of a second size. The user interface may also provide these capabilities to the user such that the user may define the tolerance values for various types of tools through the user interface.

In some instances, the user may also establish a tolerance value that is applicable for any type of tool. For example, the user may specify that any tool may be detected as being broken if the tool as captured in an image by the camera is 20% shorter in length than the model of the tool.

The processing of a current image of the tool with respect to a reference model may be further improved by the use of a parametrized region of interest (ROI) which may define the region of the image of the tool that is processed to perform the broken tool detection. That is, a user may define an area within a field of view of the camera in which it is known the tool will be visible. By selecting the particular region of interest, the tool may be more easily identifiable by the machine learning model within an image captured of the tool. This region of interest selection may also be performed through the user interface and an example of such a selection is provided in FIGS. 3-4. As is described further with respect to FIGS. 3-4, the region of interest may also be automatically identified by the system as well.

In addition to allowing the user to input information, the user interface may also present information to the user. For example, any images of the tool that are captured by the image capture device may be displayed through the user interface. The user interface may also present a comparison of the images captured by the image capture device and the model for the tool to allow the user to perform a visual comparison between the image of the tool and the reference model for the tool. In scenarios where the tool is determined to be broken, the user interface may also present an alert indicating that the tool is broken to the user. The alert may also be provided to the user in any other suitable manner, such as an auditory alert, etc. In some instances, an indication of the alert may also be transmitted to a remote device (such as a mobile device of the user) so that the user may be alerted of the broken tool even if the user is not physically present at the location of the machine in which the tool is provided. Alerts may also be used to provide any other types of information to a user. For example, an alert may indicate if a camera or other hardware becomes disconnected or otherwise non-functional.

In one or more embodiments, one or more automated actions may also be performed when a broken tool is detected. For example, if it is determined that a tool currently in use in the machine is broken, then operation of the machine may automatically be ceased. If the detection is performed after the tool has already been used, then the system may prevent the machine from further use while the tool is still provided in the machine.

While reference is made to a CNC machine, a similar approach may also be applicable to any other type of machine in which a tool may be inserted. As an additional non-limiting example, the systems and methods described herein may be applicable to additive manufacturing processes, such as three-dimensional (3D) printers, as well as any other types of machines that require the use of tools.

Turning to the figures, FIG. 1 shows an example system 100 for broken tool detection. In one or more embodiments, the system may include a machine 102 including an image capture device 106, one or more local computing devices 108, one or more mobile devices 112 (which may be associated with one or more users 113), and/or one or more remote computing devices 114. However, these components of the system 100 are merely exemplary and are not intended to be limiting in any way. For simplicity, reference may be made hereinafter to a machine 102 including an image capture device 106, a local computing device 108, a mobile device 112, and/or a remote computing device 114, etc., however, this is not intended to be limiting and may still refer to any number of such elements.

The machine 102 may be any type of machine configured to receive a tool 104 used to perform a task. For example, FIG. 1 shows that the machine 102 is a CNC machine including a drill bit that is provided as the tool 104. While the specific use case of a CNC machine is illustrated and described herein, this is not intended to be limiting and the system 100 may similarly include any other type of machine configured to receive a tool as well. Additionally, any other type of tool or combination of multiple tools may also be provided in the machine 102 to perform a given task or tasks. Furthermore, these same methods described herein may be applicable to identifying if standalone tools are broken, rather than requiring the tools to be inserted into a machine, such as machine 102.

The machine 102 also includes an image capture device 106 that may be used to capture one or more images of the tool 104 at various points in time. For example, the image capture device 106 may be a camera and/or any other type of device that is capable of capturing images of the tool 104. While reference is made herein to capturing images, the image capture device 106 may also be configured to capture video including the tool 104 as well. Additionally, any other type of sensor capable of capturing information about the tool may be provided in the machine 102 in addition to, or instead of, the image capture device 106. Any reference to "images" being captured of the tool 104 (or any other tool) is not intended to be limiting and may similarly refer to any other type of sensor data as well.

Further, the image capture device 106 (or a separate image capture device or sensor) may also be provided outside of the machine 102 as well. For example, when initial images (or other sensor data) of a tool 104 are captured to generate a reference model for the tool 104, the images may be captured outside of the machine 102 rather than requiring the tool 104 to be inserted into the machine 102.

The machine may also include an emitting device 105 that may be used to illuminate the interior of the machine 102 for the image capture of the tool 104. The emitting device 105, for example, may be a light emitting diode (LED), infrared light, etc.

The image capture device 106 may be provided in the machine 102 at any suitable location from which the image capture device 106 may capture images of the tool 104 (that is, the specific position at which the image capture device 106 is shown in FIG. 1 is merely exemplary). In one or more embodiments, the image capture device 106 may be provided in a fixed position within the machine 102 such that the field of view of the image capture device 106 includes the location of the tool 104. In some instances, the image capture device 106 may be positioned such that the largest sized tool that may be provided in the machine 102 is captured by the field of view of the image capture device 106. In this manner, even if the image capture device 106 is fixed and the field of view is not adjustable, the image capture device 106 may still capture images of any tool that may be provided in the machine 102.

In one or more embodiments, the field of view of the image capture device 106 may also be adjustable, however, even after installation within the machine 102. For example, a user may manually adjust the angle at which the image capture device 106 is pointing using a user interface 110 provided at the local computing device 108. The user may accomplish this by physically adjusting the positioning of the image capture device 106, by causing the image capture device 106 to actuate based on inputs provided to the user interface 110, etc. The image capture device 106 may also be configured to be automatically adjusted based on instructions from the local computing device 108, mobile device 112, remote computing device 114, etc.

The machine 102 may also include any other number of image capture devices 106 provided at various locations within the machine 102 as well. For example, a first image capture device may be provided at a first position within the machine 102, a second image capture device may be provided at a second position within the machine 102, etc. This may allow for multiple different angles of the tool 104 to be captured in multiple images for broken tool detection.

Furthermore, the image capture device 106 does not necessarily need to be provided inside of the machine 102 but may also be provided on the machine 102 or outside of the machine 102 as well. For example, the image capture device maybe a standalone device that is separate from the machine 102. In embodiments in which multiple image capture devices 106 are provided, one or more image capture devices 106 may be provided within the machine 102 and one or more image capture devices 106 may be provided outside of the machine 102.

In one or more embodiments, the image capture device 106 may be configured to capture images of the tool 104 at specific points in time. In some instances, the image capture device 106 may be configured to capture the images of the tool 104 based on an instruction from the local computing device 108, remote computing device 114, mobile device

112, etc. Tool detection may initially involve the creation of one or more reference models for different types of tools that may be used in the machine 102. To create a reference model for a given type of tool 104, one or more images of the tool 104 may be captured by the image capture device 106 when the tool 104 is unbroken. For example, one or more images may be captured of the tool 104 when the tool 104 is first inserted into the machine 102. In some instances, the reference models may be created at the manufacturing of the tools, however, the reference models may also be created at first usage of the tool as well. The reference model may then be stored in memory of the local computing device 108, the remote computing device 114, etc.

Once the reference model for the tool 104 is established, the image capture device 106 may then be used to capture images of the tool 104 after every use of the tool 104. For example, after the tool 104 has performed a task and is no longer in use, the image capture device 106 may subsequently capture one or more images of the tool 104 that may be used to determine if the tool 104 is broken (for example, if the tool 104 broke while performing the task). In some instances, the image capture device 106 may also capture one or more images of the tool 104 as it is performing the task, such that detection of a broken tool may be performed before the task is completed. An image (or other sensor data) of the tool 104 may also be captured when the tool 104 is first inserted into the machine 102 and before usage of the tool 104.

Any images that are captured by the image capture device 106 may be provided to the local computing device 108 and/or remote computing device 114 for processing. Depending on the type of tool that is provided in the machine 102, the local computing device 108 or remote computing device 114 may perform a comparison between the reference model for that particular tool and the one or more images of the tool captured by the image capture device 106 after use of the tool.

In one or more embodiments, the local computing device 108 and/or remote computing device 114 may host the machine learning model (or other type of model) that is used to perform the comparison between the reference model for the tool 104 and a current image of the tool 104 that is captured by the image capture device 106 after usage.

For example, the comparison between the reference model and the current image of the tool 104 may involve a comparison of geometrical properties of the tool 104 as included in the reference model and the current image. These geometrical properties may include any of such properties, such as length, width, overall shape and/or size, etc. For example, if the reference model for the tool 104 indicates that the tool 104 was originally 3 inches in length but the current image of the tool 104 indicates that the tool 104 is now 2 inches in length, then the comparison may indicate the inch difference in length between the reference model and the current image for the tool 104. Based on this difference, and the user-defined change tolerance values, the machine learning model may determine that the tool is broken 104. However, the machine learning model may also consider any other physical properties of the tool 104 and/or any other combination of properties in determining if the tool is broken.

In one or more embodiments, the properties that are considered by the machine learning model in determining if the tool 104 is broken may be user-defined. For example, the user may indicate through the user interface 110 that the machine learning model should consider the length of the tool when making the broken tool determination. The user may also make such an indication through annotations that are provided with training data, such as initial reference models for the tool 104. The machine learning model may also automatically identify the properties that are most indicative of a broken tool as well.

The local computing device 108 may also include the user interface 110. The user interface 110 may include a listing of different types of tools that are selectable by the user. When the user inserts a type of tool into the machine for usage, the user may then select the type of tool through the user interface 110 so the system accesses the reference model for that type of tool when performing the broken tool analysis. For example, the user interface 110 may present a drop-down menu including a listing of different types of tools that may be provided in the machine 102. However, the type of tool may also be selected via the user interface 110 in any other manner.

A user may interact with the user interface 110 in any number of different manners. For example, a display of the local computing device 108 (and/or any other device) may be a touchscreen display and the user may interface with the user interface 110 through the touchscreen display. As another example, the user may provide inputs to the user interface 110 through any other suitable input/output device, such as a keyboard, microphone, etc.

While reference is made to the user interface 110 herein, it should be noted that a similar user interface may be provided via any other device other than the local computing device 108. For example, similar functionality may be provided by an application of the mobile device 112 such that a user may provide similar inputs and receive similar information even when the user is not physically located at the machine 102 and the local computing device 108. Thus, any reference to the user interface 110 at the local computing device 108 is not intended to be limiting and may also be applicable to a user interface of any other device.

The identification of the type of tool may also be performed automatically without requiring a user to manually select the type of tool through the user interface 110. For example, the image capture device 106 may capture an image of the tool 104, provide the image to the local computing device 108 and/or remote computing device 114, and the local computing device 108 and/or remote computing device 114 may use computer vision techniques or any other suitable method for automatically identifying the particular type of tool. The type of tool may also be identified in any other suitable manner.

In one or more embodiments, the broken tool determination may also be performed based on user-defined tolerance values (also referred to as threshold values herein). For example, the user may specify that a tool 104 should not be determined by the machine learning model to be broken unless an overall length of the tool 104 differs from the reference model for that tool by more than an inch. The use of the length of the tool 104 is merely one example of a tolerance value that may be defined by the user and tolerance values for any other properties used to detect a broken tool may also be established. Additionally, the user may establish different tolerance values for different types of tools. For example, a drill bit of a first size may have a different length tolerance value than a drill bit of a second size. The user interface 110 may also provide these capabilities to the user such that the user may define the tolerance values for various types of tools through the user interface 110.

In some instances, the user may also establish a tolerance value that is applicable for any type of tool. For example, the user may specify that any tool may be detected as being broken if the tool as captured in an image by the camera is 20% shorter in length than the model of the tool.

The processing of a current image of the tool 104 with respect to a reference model may be further improved by the use of a parametrized region of interest (ROI) which may define the region of the image of the tool 104 that is processed to perform the broken tool detection. That is, a user may define an area within a field of view of the image capture device 106 in which it is known the tool 104 will be visible. By selecting the particular region of interest, the tool 104 may be more easily identifiable by the machine learning model within an image captured of the tool 104. This region is interest selection may also be performed through the user interface and an example of such a selection is provided in FIG. 3. As is described further with respect to FIG. 3, the region of interest may also be automatically identified by the system as well.

In addition to allowing the user to input information, the user interface 110 may also present information to the user. For example, any images of the tool 104 that are captured by the image capture device 106 may be displayed through the user interface 110. The user interface 110 may also present a comparison of the images captured by the image capture device 106 and the model for the tool 104 to allow the user to perform a visual comparison between the image of the tool 104 and the reference model for the tool 104. In scenarios where the tool 104 is determined to be broken, the user interface 110 may also present an alert indicating that the tool 104 is broken to the user. The alert may also be provided to the user in any other suitable manner, such as an auditory alert, etc. In some instances, an indication of the alert may also be transmitted to a remote device (such as the mobile device 112) so that the user may be alerted of the broken tool even if the user is not physically present at the location of the machine 102 in which the tool 104 is provided. The remote device may then present the alert to the user.

In one or more embodiments, any of the elements of the system 100 (for example, the machine 102, the image capture device 106, one or more local computing devices 108, one or more mobile devices 112, one or more remote computing devices 114, etc., and/or any other element described with respect to FIG. 100 or otherwise) may be configured to communicate via a communications network 120. The communications network 120 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 120 may have any suitable communication range associated therewith and may include, for example, global networks (e.g., the Internet), metropolitan area networks (MANs), wide area networks (WANs), local area networks (LANs), or personal area networks (PANs). In addition, communications network 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements of the system 100 may include any of the elements of the computing device 800 as well. For example, one or more processors 802, memory 804, etc.

Figure 2:
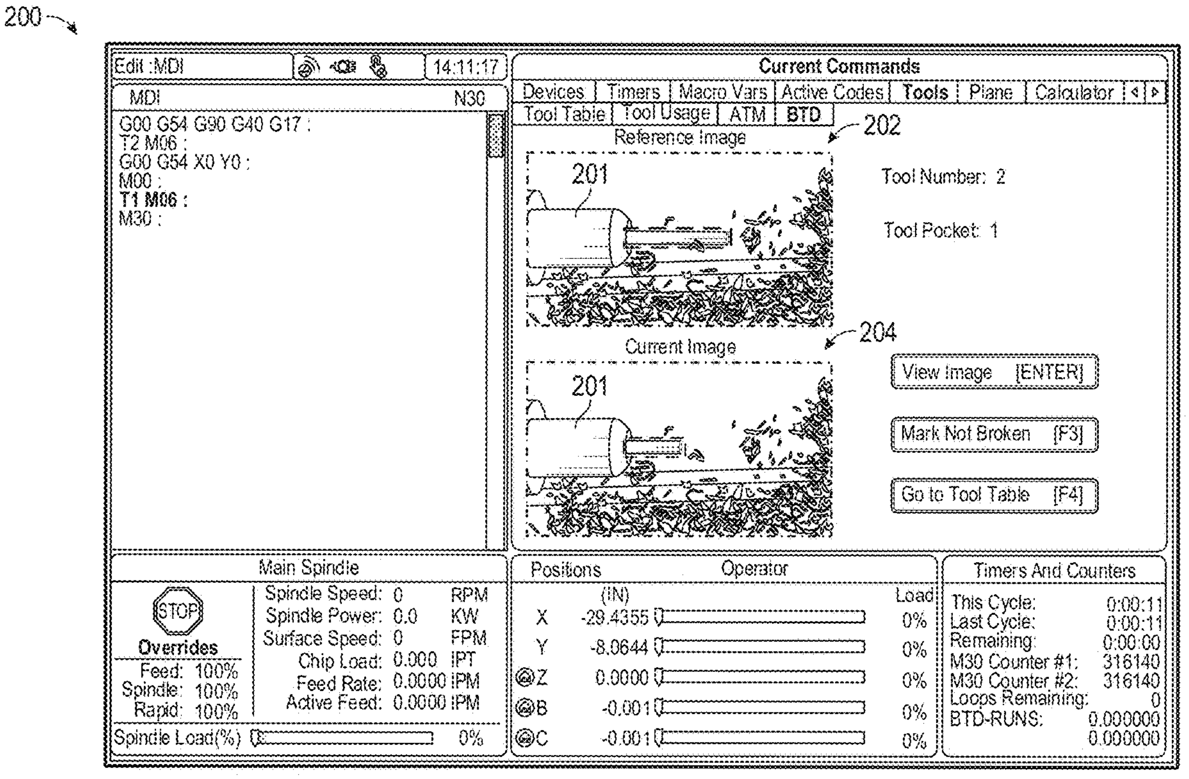
FIGS. 2-3 depict example user interfaces for automated broken tool detection in accordance with one or more example embodiments of the disclosure.
Figure 3:
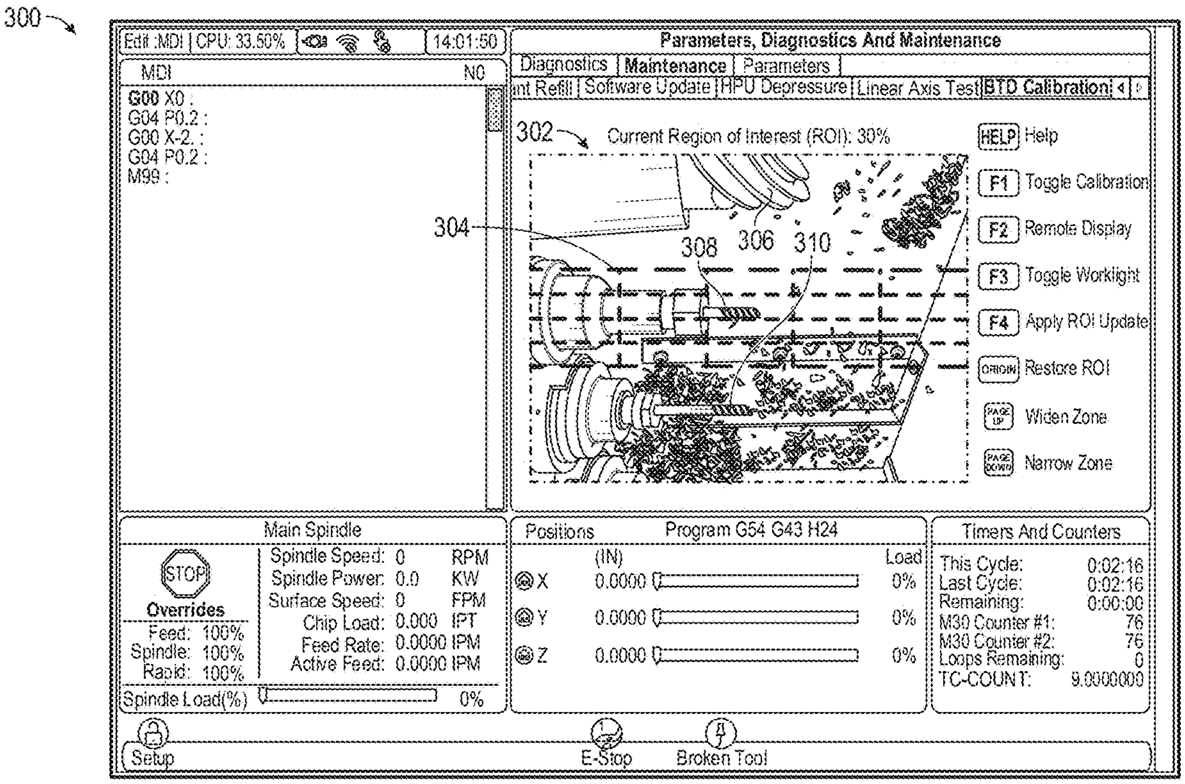

FIGS. 2-3 depict example user interfaces for automated broken tool detection in accordance with one or more example embodiments of the disclosure. For example, the user interfaces shown in FIGS. 2-3 may be examples of user interfaces 110 that are presented on the local computing device 108, remote computing device 114, mobile device 112 (or any other user interface described herein or otherwise).

Beginning with FIG. 2, a user interface 200 is shown that includes images of a tool 201 (such as tool 104, for example) that are captured by an image capture device (such as image capture device 106, for example). A first image 202 may include a reference image of the tool that is captured before usage of the tool 201. A second image 204 may include a current image of the tool 201 that is captured after usage of the tool 201.

In some instances, the first image 202 and the second image 204 may be presented on the user interface 200 when it is determined (for example, by the local computing device 108 and/or remote computing device 114 or any other system and/or device described herein or otherwise) that the tool 201 is broken after usage. That is, the two images may be presented when the broken tool is detected to provide the user with a visual indication as to how the tool is broken. For example, in FIG. 2, the second image 204 shows that the tool 201 is shorter in length than in the first image 202. This may indicate that a portion of the tool 201 broke off such that the tool 201 is now shorter in length than it originally was. However, the first image 202 and second image 204 may also be presented after every usage of the tool 201 as well (even if the tool 201 is not detected to be broken after usage).

Although the user interface 200 shows a reference image compared with a current image, this does not necessarily mean that the determination as to whether the tool 201 is broken is based on an image comparison. As aforementioned, a model of the tool 201 may be generated based on one or more images captured of the tool 201 before use of the tool 201. The current image of the tool 201 that is captured by the image capture device may be compared with the model of the tool instead of the original image of the tool in some instances. However, the reference image of the tool may still be presented instead of the model to allow a user to more easily identify how the tool is broken.

The user interface 200 may also provide any other relevant information as well, such as a type of tool that is shown in the images, a manner in which the tool is broken (for example, the user interface 200 may indicate that the tool is shorter in length in the current image than in the reference image), etc.

FIG. 3 shows another user interface 300 illustrating the region of interest 304 for an image captured by an image capture device. That is, the user interface 300 may allow a user to indicate a region of an image captured by an image capture device that should be analyzed for broken tool detection. For example, the user interface 300 shows an image 302 representing the current field of view of the image capture device. Alternatively, the image 302 may instead be a real-time video feed of the field of view of the image capture device. Also shown is an overlay on top of the image 302 or real-time video feed is the indication of the region of interest 304. The region of interest 304 may provide a visual indication of the region of any images captured by the image capture device that is to be analyzed by the machine learning model. Thus, the region of interest 304 may also be provided as an input to the machine learning model as well. The region of interest 304 may be adjusted by the user through the user interface 300.

The use of the region of interest 304 may be particularly beneficial if there are multiple tools included in the field of view of the image capture device. For example, FIG. 3 shows that the region of interest 304 is adjusted such that the region of interest 304 only includes a first tool 308 instead of a second tool 306 and a third tool 310. If it is desired to only determine if the first tool 308 is broken, then the user may adjust the region of interest 304 to only include the first tool 308, as shown in the figure. The region of interest 304 may also be adjusted to any other shape and/or size and may cover any other portion of the image 302. Additionally, in some instances, multiple regions of interest may also be provided as well.

The region of interest 304 may serve the further purpose of assisting the machine learning model in identifying the tool of interest within the image captured by the image capture device. That is, rather than the model manually needing to identify the location of the tool in the image, the operator may simply provide an indication of the location of the tool within the image using the region of interest. If the image capture device is fixed and the location of the tool is fixed, then any subsequent image captured by the image capture device may include the desired tool within the region of interest 304. However, the region of interest 304 may always be adjusted as needed based on any adjustments to the positioning of the image capture device, the tool, etc.

Additionally, as aforementioned, the tool may also be identified within the image automatically using computer vision or similar techniques. For example, the tool may be identified within the image without the user needing to manually provide the region of interest around the tool.

FIGS. 4-7 depict example methods for automated broken tool detection in accordance with one or more example embodiments of the disclosure. Some or all of the blocks of the process flows or methods of FIGS. 4-7 in this disclosure may be performed in a distributed manner across any number of devices or systems (for example, the machine 102, the image capture device 106, one or more local computing devices 108, one or more mobile devices 112, one or more remote computing devices 114, computing device 800, etc.). The operations of the blocks of the process flows or methods may be optional and may be performed in a different order.

Figure 4:
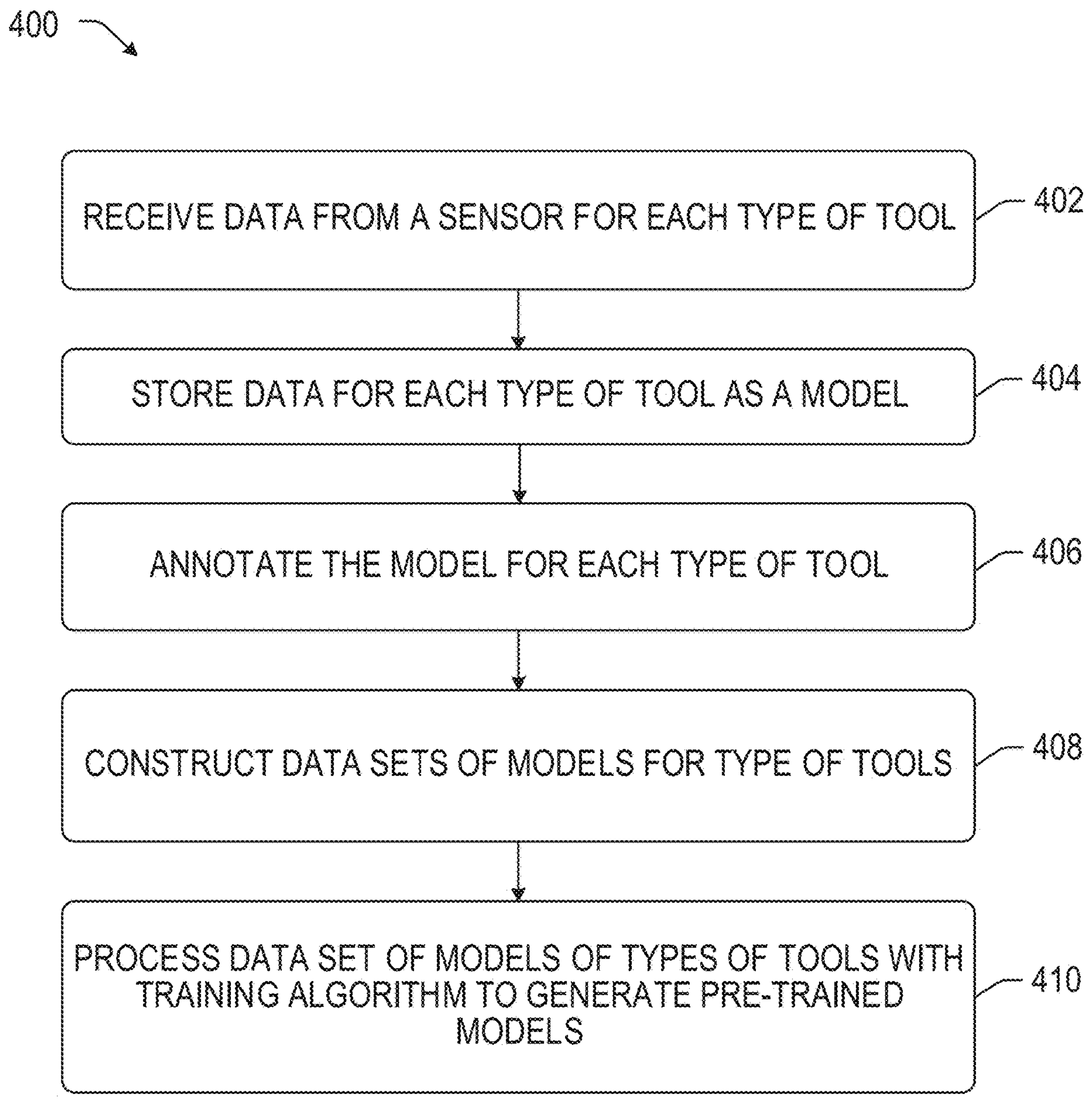
FIGS. 4-7 depict example methods for automated broken tool detection in accordance with one or more example embodiments of the disclosure.

Beginning with FIG. 4, an example method 400 for generating tool models is shown. At block 402 of the method 400, computer-executable instructions stored on a memory of a system or device, such as the machine 102, the image capture device 106, one or more local computing devices 108, one or more mobile devices 112, one or more remote computing devices 114, computing device 800, etc., may be executed to receive data from a sensor for each type of tool.

In one or more embodiments, the sensor may be an image capture device, such as a camera (for example, image capture device 106 and/or any other image capture device described herein or otherwise). However, any other sensor may also be used to capture information about the tool as well.

Additionally, data may be captured for the tools in different conditions. For example, data may be captured about a tool that is in a dry condition or sprayed with a coolant, as well as any other conditions.

At block 404 of the method 400, computer-executable instructions stored on a memory of a system or device may be executed to store data for each type of tool as a model for the tool. That is, based on the data captured by the sensor, a model of the tool may be generated. The model may be a digital representation of the tool such that the physical parameter of the tool may be captured by the model. For example, the model may include the dimensions of the physical tool, the spare of the cool, etc. In one or more embodiments, the model may include a trained machine learning model. The model may then be stored in memory (for example, in memory of the local computing device 108, remote computing device 114, and/or any other device or system) and may subsequently be used as a reference model for identifying if the tool is broken after subsequent usage.

Additionally, different models may be generated and stored for different types of tools as well. For example, a first reference model may be generated for a first type of tool and a second reference model may be generated for a second type of tool. Further, distinct reference models may also be generated for tools that are similar in the type of task they are used to perform but different in physical properties, such as dimensions. For example, two distinct reference models may be generated for drill bits that are different sizes. Generating the various reference models may provide a frame of reference for various types of tools when the broken tool analysis is performed by the machine learning model.

At block 406 of the method 400, computer-executable instructions stored on a memory of a system or device may be executed to annotate the model for each type of tool. For example, annotation may involve a user manually adding details, such as the type of tool, features of interest, and/or any other types of data that may be used for training purposes. The annotations may be provided in any suitable manner. For example, the reference model may be displayed on a user interface and the user may provide inputs to the user interface to annotate the reference models. In some instances, the annotations may also be provided on the reference image from which the reference model is generated as well.

At block 408 of the method 400, computer-executable instructions stored on a memory of a system or device may be executed to construct data sets of models for type of tools. At block 410 of the method 400, computer-executable instructions stored on a memory of a system or device may be executed to process data set of models of types of tools with training algorithms to generate pre-trained models. That is, the digital representation of the tools as captured by the models of the tools, as well as the annotation data added by the user, may be used to train one or more machine learning models that may then be used to detect broken tools.

Figure 5:
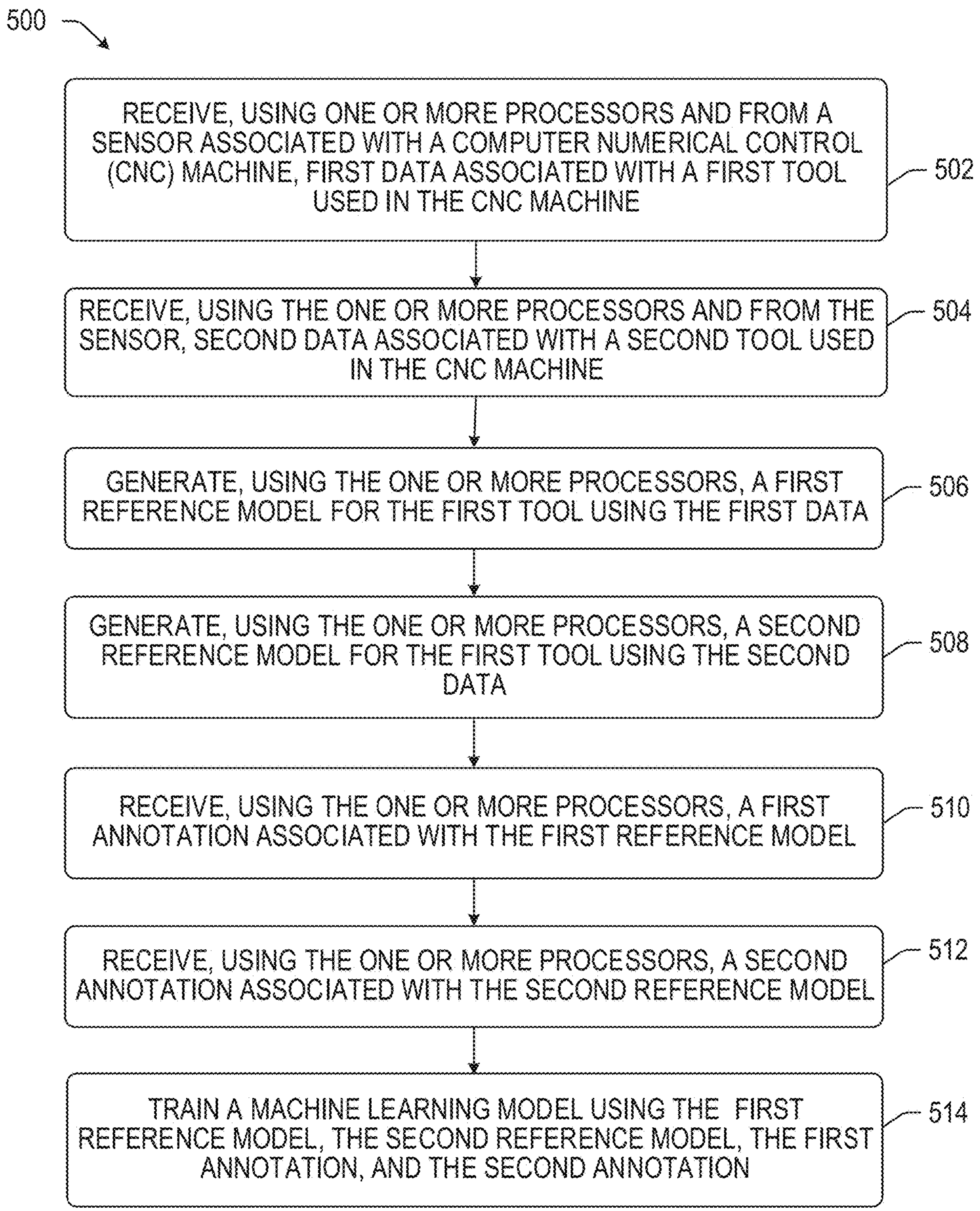

Turning to FIG. 5, an example method 500 for pre-training a computing model is shown. At block 502 of the method 500, computer-executable instructions stored on a memory of a system or device, such as the machine 102, the image capture device 106, one or more local computing devices 108, one or more mobile devices 112, one or more remote computing devices 114, computing device 800, etc., may be executed to receiving, using one or more processors and from a sensor associated with a computer numerical control (CNC) machine, first data associated with a first tool used in the CNC machine. However, the method 500 may also be applicable to any other type of machine other than a CNC machine as well.

At block 504 of the method 500, computer-executable instructions stored on a memory of a system or device may be executed to receive, using the one or more processors and from the sensor, second data associated with a second tool used in the CNC machine.

At block 506 of the method 500, computer-executable instructions stored on a memory of a system or device may be executed to generate, using the one or more processors, a first reference model for the first tool using the first data. At block 508 of the method 500, computer-executable instructions stored on a memory of a system or device may be executed to generate, using the one or more processors, a second reference model for the first tool using the second data.

At block 510 of the method 500, computer-executable instructions stored on a memory of a system or device may be executed to receive, using the one or more processors, a first annotation associated with the first reference model. At block 512 of the method 500, computer-executable instructions stored on a memory of a system or device may be executed to receive, using the one or more processors, a second annotation associated with the second reference model At block 514 of the method 500, computer-executable instructions stored on a memory of a system or device may be executed to train a machine learning model using the first reference model, the second reference model, the first annotation, and the second annotation.

Figure 6A:
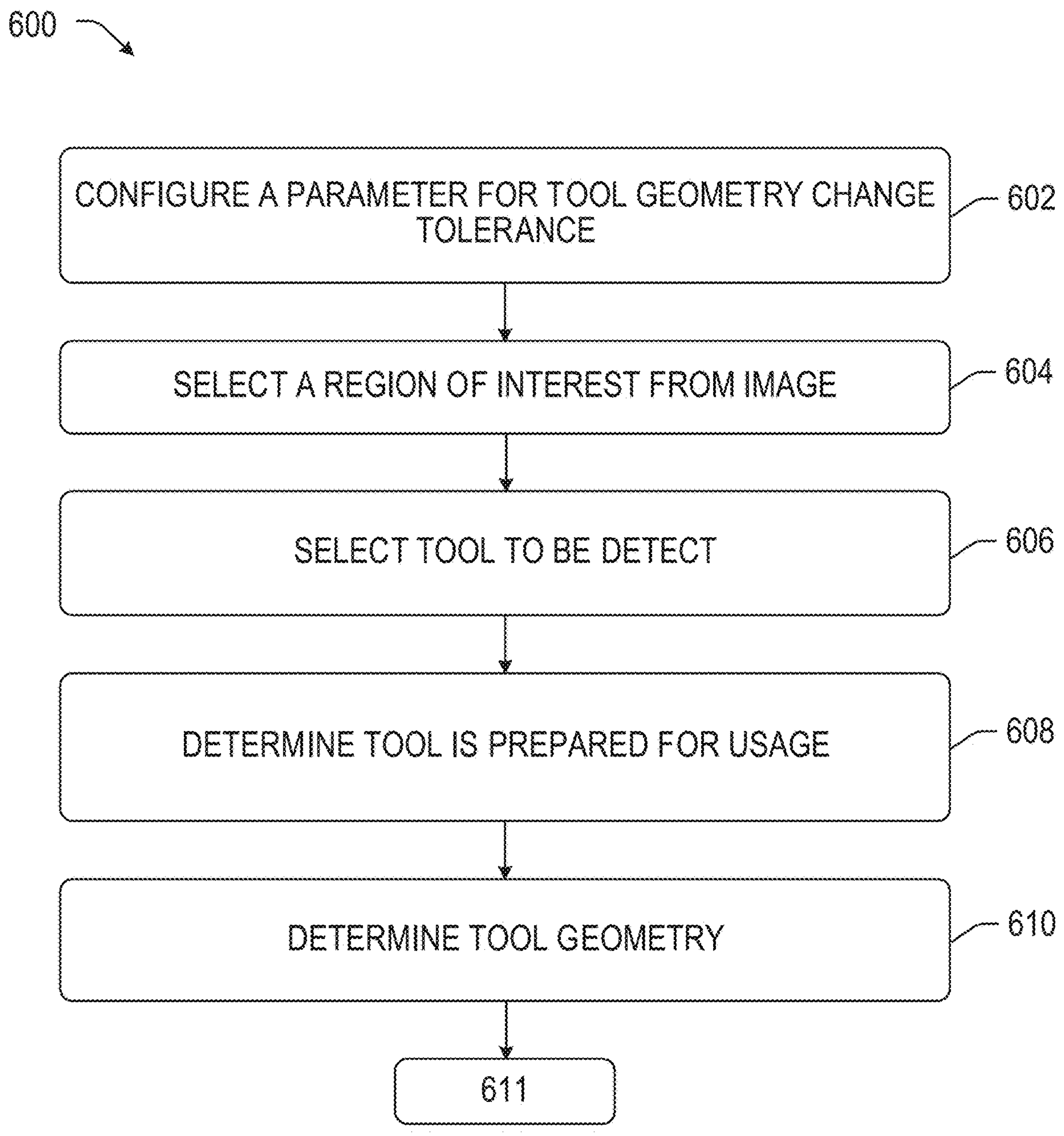
Figure 6B:
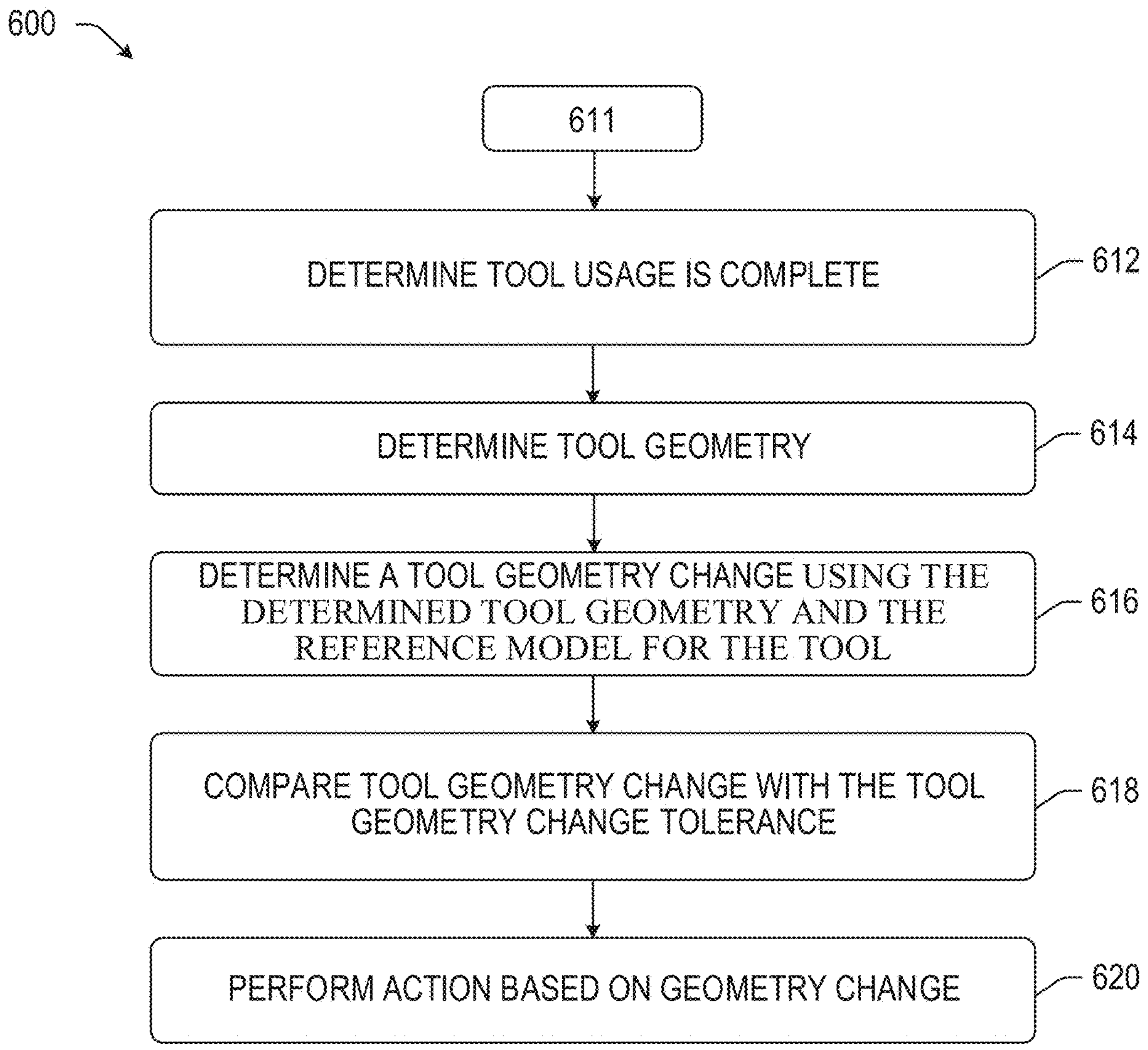

FIGS. 6A-6B an example method 600 for identifying a broken tool is shown. At block 602 of the method 600, computer-executable instructions stored on a memory of a system or device, such as the machine 102, the image capture device 106, one or more local computing devices 108, one or more mobile devices 112, one or more remote computing devices 114, computing device 800, etc., may be executed to configure a parameter for tool geometry change tolerance. That is, the broken tool determination may be performed based on user-defined tolerance values (also referred to as threshold values herein). For example, the user may specify that a tool should not be determined by the machine learning model to be broken unless an overall length of the tool differs from the reference model for that tool by more than an inch. The use of the length of the tool is merely one example of a tolerance value that may be defined by the user and tolerance values for any other properties used to detect a broken tool may also be established. Additionally, the user may establish different tolerance values for different types of tools. For example, a drill bit of a first size may have a difference length tolerance value than a drill bit of a second size. The user interface may also provide these capabilities to the user such that the user may define the tolerance values for various types of tools through the user interface.

At block 604 of the method 600, computer-executable instructions stored on a memory of a system or device may be executed to identify the selection of a region of interest from an image. That is, a user may define an area within a field of view of the camera in which it is known the tool will be visible. By selecting the particular region of interest, the tool may be more easily identifiable by the machine learning model within an image captured of the tool. This region is interest selection may also be performed through the user interface and an example of such a selection is provided in FIG. 3. As is described further with respect to FIG. 3, the region of interest may also be automatically identified by the system as well.

At block 606 of the method 600, computer-executable instructions stored on a memory of a system or device may be executed to select tool to be detect. For example, when providing a tool into the machine for usage, the user may also select the tool via the user interface. Based on this selection, the system or device may determine which of the reference models to access to serve as a frame of reference for the broken tool analysis (the model associated with the tool selected by the user via the user interface).

At block 608 of the method 600, computer-executable instructions stored on a memory of a system or device may be executed to determine if the tool is prepared for usage. At block 610 of the method 600, computer-executable instructions stored on a memory of a system or device may be executed to determine tool geometry. The user may provide a manual indication via the user interface that the tool is provided in the machine and ready for usage. Alternatively, the machine may automatically determine that the tool is provided and ready for usage. For example, the image capture device may capture and image of the tool and the image may be analyzed (for example, the local computing device 108 and/or the remote computing device 114, etc.) to determine if the tool is properly inserted into the machine and ready for usage.

At block 612 of the method 600, computer-executable instructions stored on a memory of a system or device may be executed to determine if tool usage is complete. Similarly, the user may provide a manual indication that the tool usage is complete. For example, when the current task being performed by the machine using the tool has completed, the user may manually indicate via the user interface that the tool usage is complete.

Alternatively, the machine may automatically determine that the tool usage is complete. For example, if the machine is a CNC machine, the CNC machine may be programmed to run a set of instructions to cause the tool to perform certain operations. Once the instructions are complete, the CNC machine may determine that the usage of the tool is complete. As another example, the image capture device may capture an image (or video) of the tool and the image (or video) may be analyzed (for example, the local computing device 108 and/or the remote computing device 114, etc.) to determine if the usage of the tool is complete. If a video is captured by the image capture device, subsequent frames of the video may be analyzed to determine if the tool is static for a given period of time or is moving and in use.

At block 614 of the method 600, computer-executable instructions stored on a memory of a system or device may be executed to determine a geometry of the tool. The geometry of the tool may be determined using the current image of the tool that is captured by the image capture device. For example, any suitable computer vision techniques may be used to determine the geometry from the image.

At block 616 of the method 600, computer-executable instructions stored on a memory of a system or device may be executed to determine a tool geometry change using the determined tool geometry and the reference model for the tool. To make this determination, the geometry of the tool as determined by the current image captured by the image capture device may be compared to the geometry associated with the reference model. This comparison may be performed using one or more machine learning models.

At block 618 of the method 600, computer-executable instructions stored on a memory of a system or device may be executed to compare the tool geometry change with the tool geometry change tolerance. As aforementioned, a user may configure a parameter for tool geometry change tolerance. Continuing the above example, the user may specify that a tool should not be determined by the machine learning model to be broken unless an overall length of the tool differs from the reference model for that tool by more than an inch. If it is determined that the difference in length between the tool shown in the current image (as determined in block 614) is less than an inch, then it may be determined that the tool does not satisfy the configured parameter for determining that a tool is broken. However, if it is determined, for example, that the difference in length is two inches, then it may be determined that the tool does satisfy the configured parameter for determining that the tool is broken.

At block 620 of the method 600, computer-executable instructions stored on a memory of a system or device may be executed to perform an action based on the geometry change. For example, any images of the tool that are captured by the image capture device may be displayed through the user interface. The user interface may also present a comparison of the images captured by the image capture device and the model for the tool to allow the user to perform a visual comparison between the image of the tool and the reference model for the tool. In scenarios where the tool is determined to be broken, the user interface may also present an alert indicating that the tool is broken to the user. The alert may also be provided to the user in any other suitable manner, such as an auditory alert, etc. In some instances, an indication of the alert may also be transmitted to a remote device (such as a mobile device of the user) so that the user may be alerted of the broken tool even if the user is not physically present at the location of the machine in which the tool is provided.

In one or more embodiments, one or more automated actions may also be performed when a broken tool is detected. For example, if it is determined that a tool currently in use in the machine is broken, then operation of the machine may automatically be ceased. If the detection is performed after the tool has already been used, then the system may prevent the machine from further use while the tool is still provided in the machine.

Figure 7:
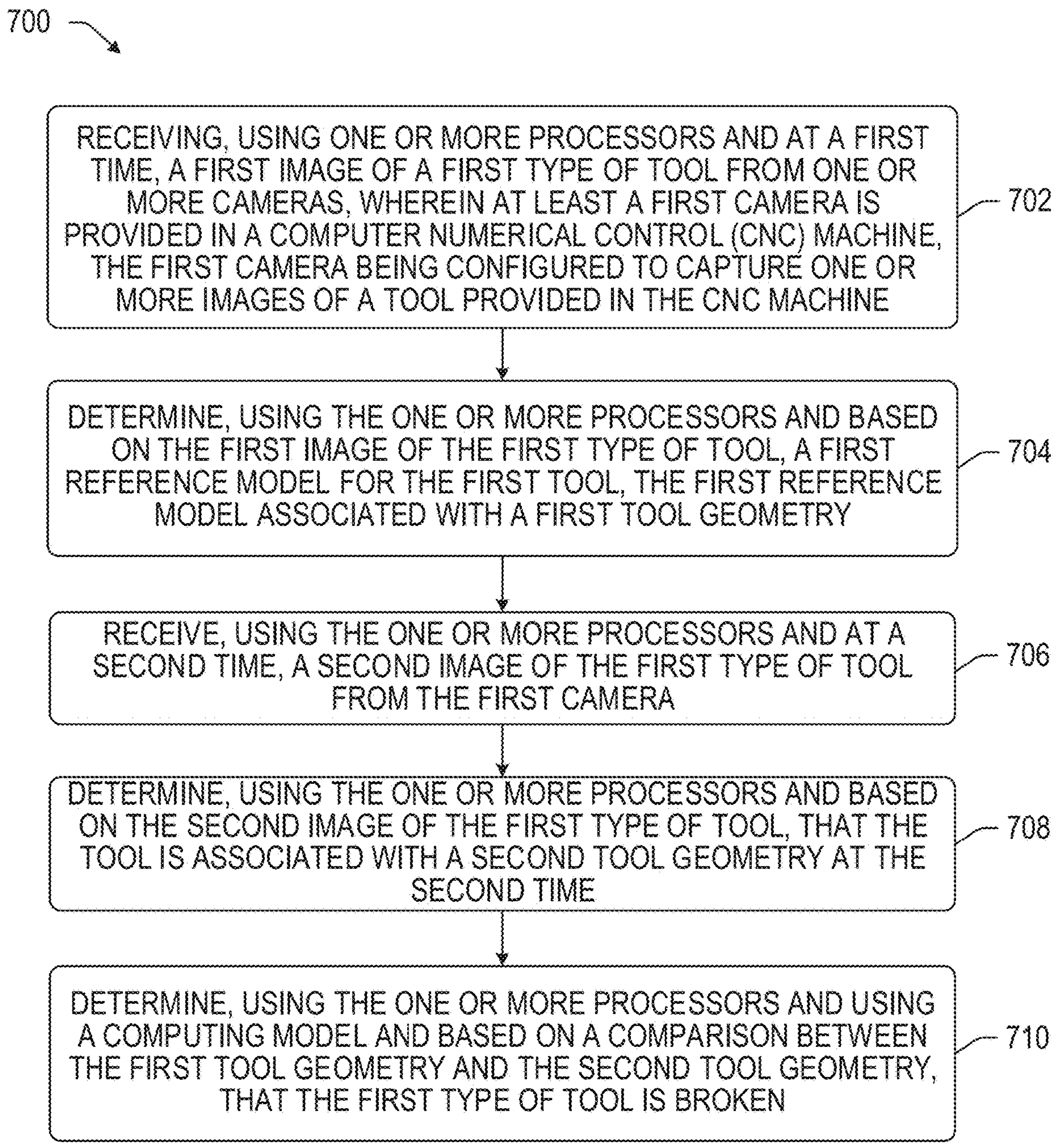

Turning to FIG. 7, an example method 700 for pre-training a computing model is shown. At block 702 of the method 700, computer-executable instructions stored on a memory of a system or device, such as the machine 102, the image capture device 106, one or more local computing devices 108, one or more mobile devices 112, one or more remote computing devices 114, computing device 800, etc., may be executed to receive, using one or more processors and at a first time, a first image of a first type of tool from one or more cameras, wherein at least a first camera is provided in a computer numerical control (CNC) machine, the first camera being configured to capture one or more images of a tool provided in the CNC machine. Additionally, any other type of machine may be applicable other than a CNC machine.

At block 704 of the method 700, computer-executable instructions stored on a memory of a system or device may be executed to determining, using the one or more processors and based on the first image of the first type of tool, a first reference model for the first tool, the first reference model associated with a first tool geometry.

That is, in one or more embodiments, reference models for a variety of different types of tools that may be used in a machine may be generated. The images of the different tools may be captured by cameras that are provided outside of the machine. That is, the images may be captured and the reference models may be generated without requiring the tools to be inserted into the machine to capture the images. However, in some embodiments, the initial images that are captured to generate the reference models for the tools may be captured by a camera within the machine as well. For example, before operation of the machine, a tool may be inserted into the machine and images of the tool may be captured to generate the reference model for that tool (that is, before the machine is in operation).

At block 706 of the method 700, computer-executable instructions stored on a memory of a system or device may be executed to receive, using the one or more processors and at a second time, a second image of the first type of tool from the camera. That is, when a tool is inserted into the machine prior to operation of the machine using the tool, one or more images of the tool may be captured. Once the one or more images of the tool are captured, the system or device may identify the type of tool that is included in the picture (for example, using computer vision or any other suitable technique). Based on identifying the type of tool, the previously-generated reference model for the tool may be accessed by the system or device.

At block 708 of the method 700, computer-executable instructions stored on a memory of a system or device may be executed to determine, using the one or more processors and based on the second image of the first type of tool, that the tool is associated with a second tool geometry at the second time. In one or more embodiments, the camera may capture one or more second images of the tool after operation of the machine has completed (that is, once the tool has been used within the machine). Similarly, the system or device may identify the tool within the one or more second images. However, in some instances, the system or device may have stored information about the tool that is currently within the machine such that the tool may not need to be identified again in the one or more second images.

At block 710 of the method 700, computer-executable instructions stored on a memory of a system or device may be executed to determine, using the one or more processors and using a computing model and based on a comparison between the first tool geometry and the second tool geometry, that the first type of tool is broken.

Figure 8:
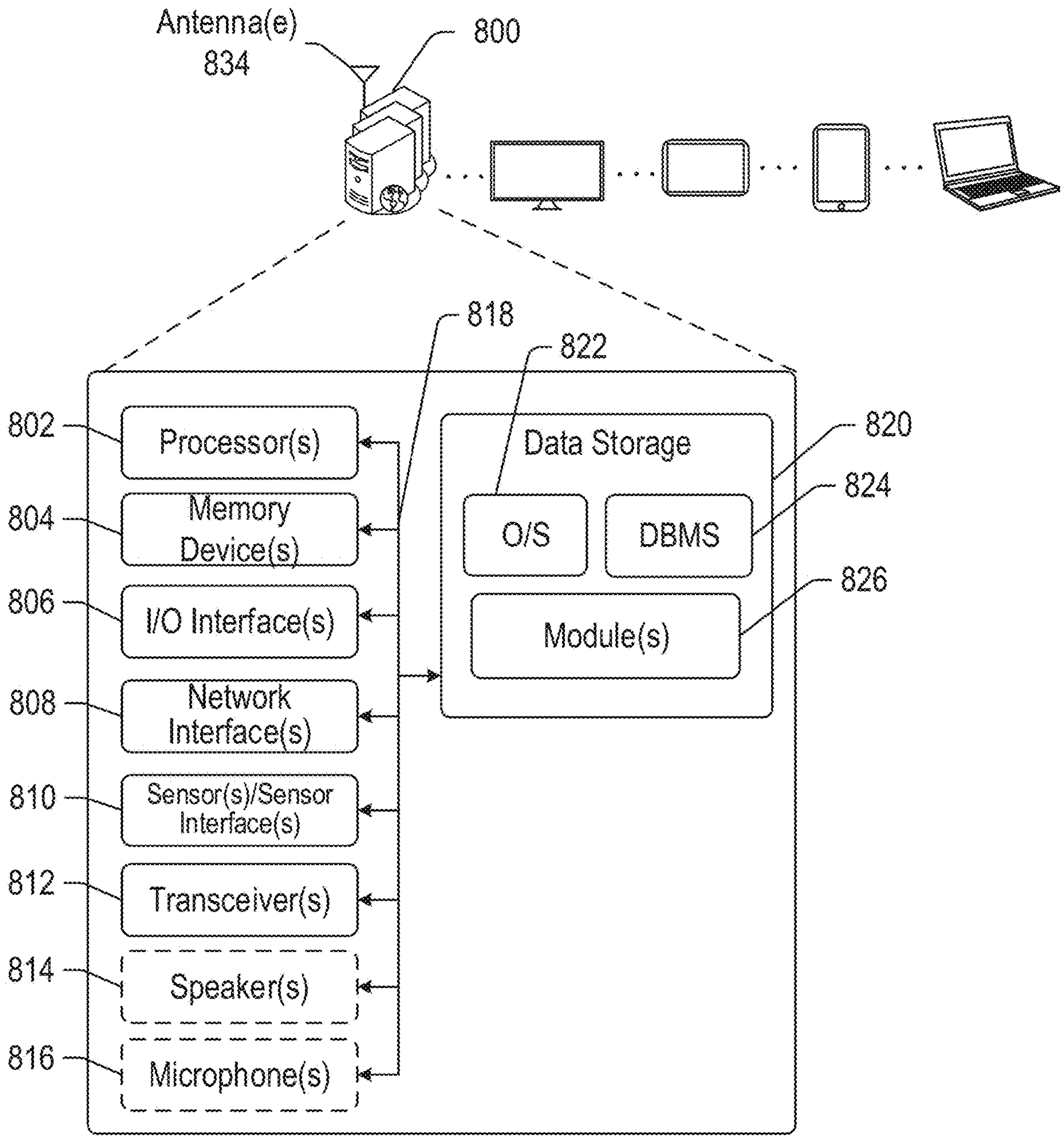
FIG. 8 depicts an example computing device in accordance with one or more example embodiments of the disclosure.

FIG. 8 is a schematic block diagram of an illustrative computing device 800 in accordance with one or more example embodiments of the disclosure. The computing device 800 may include, for example, the local computing device 108, the remote computing device 114, the mobile device 112, and/or any other device or system as described herein.

The computing device 800 may be configured to communicate via one or more networks with one or more servers, search engines, mobile devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The computing device 800 may further include one or more buses 818 that functionally couple various components of the computing device 800. The computing device 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the computing device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more module(s) 826. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the computing device 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, purchase history information, user action information, user profile information, a database linking search queries and user actions, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the module(s) 826 may include computer-executable instructions, code, or the like that responsive to execution by one or more of the processor(s) 802 may perform functions including, but not limited to, analyzing any reference images to generate reference models for a given tool, comparing current images of a tool with a reference model for the tool, generating an alert is a broken tool is detected, and/or any other types of analyses, operations, etc. described herein.

Referring now to other illustrative components depicted as being stored in the data storage 820, the O/S 822 may be loaded from the data storage 820 into the memory 804 and may provide an interface between other application software executing on the computing device 800 and hardware resources of the computing device 800. More specifically, the O/S 822 may include a set of computer-executable instructions for managing hardware resources of the computing device 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 800 is a mobile device, the DBMS 824 may be any suitable light-weight DBMS optimized for performance on a mobile device.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 800 may further include one or more network interface(s) 808 via which the computing device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the computing device 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computing device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:

one or more cameras, wherein at least a first camera of the one or more cameras is provided in a computer numerical control (CNC) machine, the first camera being configured to capture one or more images of a tool provided in the CNC machine;

memory that stores computer-executable instructions; and one or more processors configured to access the memory and execute the computer-executable instructions to:

receive, via a user interface of the CNC machine, a user selection of a first type of tool, wherein a first reference model for the first type of tool is stored in memory;

receive, at a first time, a first image of the first type of tool within the CNC machine from the one or more cameras;

generate, based on the first image of the first type of tool, a first reference model for the first type of tool, the first reference model associated with a first tool geometry;

receive, at a second time, a second image of the first type of tool from the first camera;

determine, based on the second image of the first type of tool, that the tool is associated with a second tool geometry at the second time; and determine, using a computing model and based on a comparison between the first tool geometry and the second tool geometry, that the first type of tool is broken.

2. The system of claim 1, wherein the one or more processors are further configured to execute the computer-executable instructions to:

generate an alert providing an indication that the first type of tool is determined to be broken.

3. The system of claim 1, further comprising:

an illumination system provided in the CNC machine and configured to illuminate the CNC machine during capture of at least one of the first image and second image.

4. The system of claim 1, wherein the first time corresponds to the first type of tool being provided in the CNC machine and before usage of the first type of tool.

5. The system of claim 1, wherein the second time is subsequent to usage of the first type of tool within the CNC machine.

6. The system of claim 1, wherein the one or more processors are further configured to execute the computer-executable instructions to:

receive, via a user interface, a selection of a region of interest within a field of view of the first camera, wherein determining that the first type of tool is associated with the second tool geometry is performed by analyzing the region of interest.

7. The system of claim 1, wherein determining that the first type of tool is broken further comprises comparing a difference between the first tool geometry and the second tool geometry to a first user-defined threshold value.

8. The system of claim 7, wherein the one or more processors are further configured to execute the computer-executable instructions to:

receive, via the user interface, a selection of a second type of tool, wherein a second reference model for the second type of tool is stored in memory, the second reference model associated with a third tool geometry;

receive, subsequent to usage of the second type of tool, an image of the second type of tool from the first camera;

determine, based on the image of the second type of tool, that the tool is associated with a fourth tool geometry;

present, via the user interface of the CNC machine, a comparison of the image of the second type of tool and the reference model for the second type of tool; and determine, based on a comparison between the third tool geometry and the fourth tool geometry, that the second type of tool is broken.

9. The system of claim 8, wherein determining that a second type of tool is broken comprises comparing a difference between the third tool geometry and the fourth tool geometry to a second user-defined threshold value that is different than the first user-defined threshold value.

10. The system of claim 1, wherein the one or more processors are further configured to execute the computer-executable instructions to:

receive an annotation associated with the first reference model, wherein the computing model is trained using the first reference model and the annotation.

11. A method comprising:

receiving, using one or more processors and via a user interface of a computer numerical control (CNC) machine, a user selection of a first type of tool, wherein a first reference model for the first type of tool is stored in memory;

receiving, using one or more processors and at a first time, a first image of the first type of tool within the CNC machine from one or more cameras, wherein at least a first camera of the one or more cameras is provided in a CNC machine, the first camera being configured to capture one or more images of a tool provided in the CNC machine;

generate, using the one or more processors and based on the first image of the first type of tool, a first reference model for the first type of tool, the first reference model associated with a first tool geometry;

receiving, using the one or more processors and at a second time, a second image of the first type of tool from the first camera;

determining, using the one or more processors and based on the second image of the first type of tool, that the tool is associated with a second tool geometry at the second time; and determining, using the one or more processors and using a computing model and based on a comparison between the first tool geometry and the second tool geometry, that the first type of tool is broken.

12. The method of claim 11, further comprising:

generating an alert providing an indication that the first type of tool is determined to be broken.

13. The method of claim 11, further comprising:

illuminating, using an illumination system, the CNC machine during capture of at least one of the first image and second image.

14. The method of claim 11, wherein the first time corresponds to the first type of tool being provided in the CNC machine and before usage of the first type of tool.

15. The method of claim 11, wherein the second time is subsequent to usage of the first type of tool within the CNC machine.

16. The method of claim 11, further comprising:

receiving, via a user interface, a selection of a region of interest within a field of view of the first camera, wherein determining that the first type of tool is associated with the second tool geometry is performed by analyzing the region of interest.

17. The method of claim 11, wherein determining that the first type of tool is broken further comprises comparing a difference between the first tool geometry and the second tool geometry to a first user-defined threshold value.

18. The method of claim 17, further comprising:

receiving, via the user interface, a selection of a second type of tool, wherein a second reference model for the second type of tool is stored in memory, the second reference model associated with a third tool geometry;

receiving, subsequent to usage of the second type of tool, an image of the second type of tool from the first camera;

determining, based on the image of the second type of tool, that the tool is associated with a fourth tool geometry; and determining, based on a comparison between the third tool geometry and the fourth tool geometry, that the second type of tool is broken.

19. The method of claim 18, wherein determining that a second type of tool is broken comprises comparing a difference between the third tool geometry and the fourth tool geometry to a second user-defined threshold value that is different than the first user-defined threshold value.

20. A method for generating a pre-trained tool model comprising:

receiving, using one or more processors and from a sensor, first data associated with a first type of tool used in a CNC machine;

receiving, using the one or more processors and from the sensor, second data associated with a second tool used in the CNC machine;

generating, using the one or more processors, a first reference model for the first type of tool using the first data;

generating, using the one or more processors, a second reference model for the first type of tool using the second data;

receiving, using the one or more processors, a first annotation associated with the first reference model;

receiving, using the one or more processors, a second annotation associated with the second reference model;

training a machine learning model using the first reference model, the second reference model, the first annotation, and the second annotation;

receive, subsequent to usage of the second type of tool, an image of the second type of tool from the first camera;

capture, by a camera of a CNC machine, an image of the first type of tool with the tool inside a CNC machine; and present, via the user interface of the CNC machine, a comparison of the image of the first type of tool and the first reference model.

* * * * *